March 19, 1968 H. V. HANSEN ET AL 3,373,705
PLANTER
Filed April 30, 1965
4 Sheets-Sheet 1
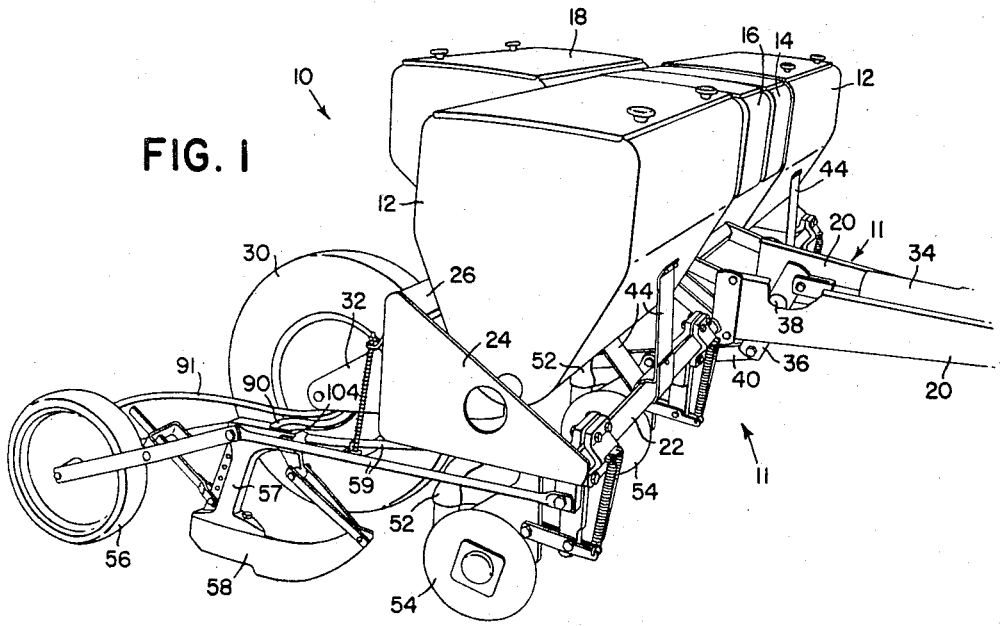
FIG. 1
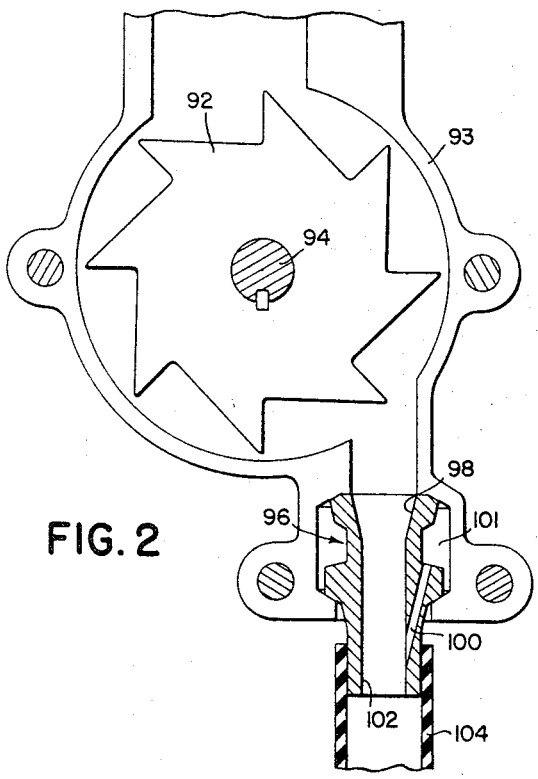
FIG. 2
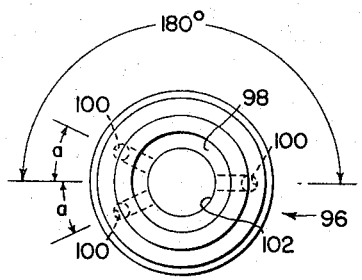
FIG. 3
INVENTORS.
HAROLD V. HANSEN
VIRGIL R. MC CUMBER
BY
ATTORNEY

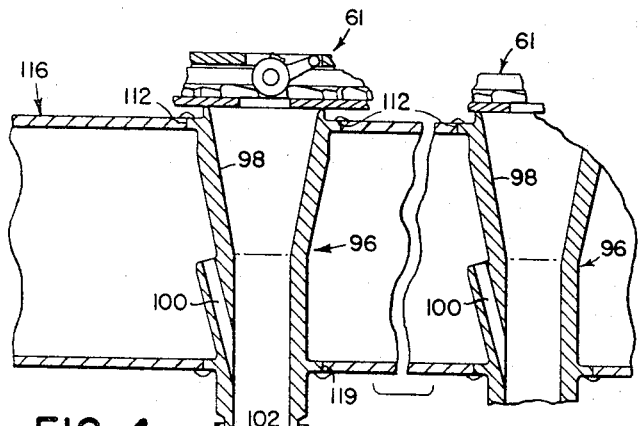
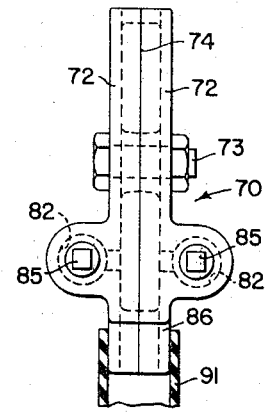
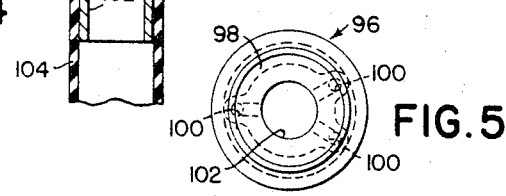
FIG. 4  FIG. 5  FIG. 11
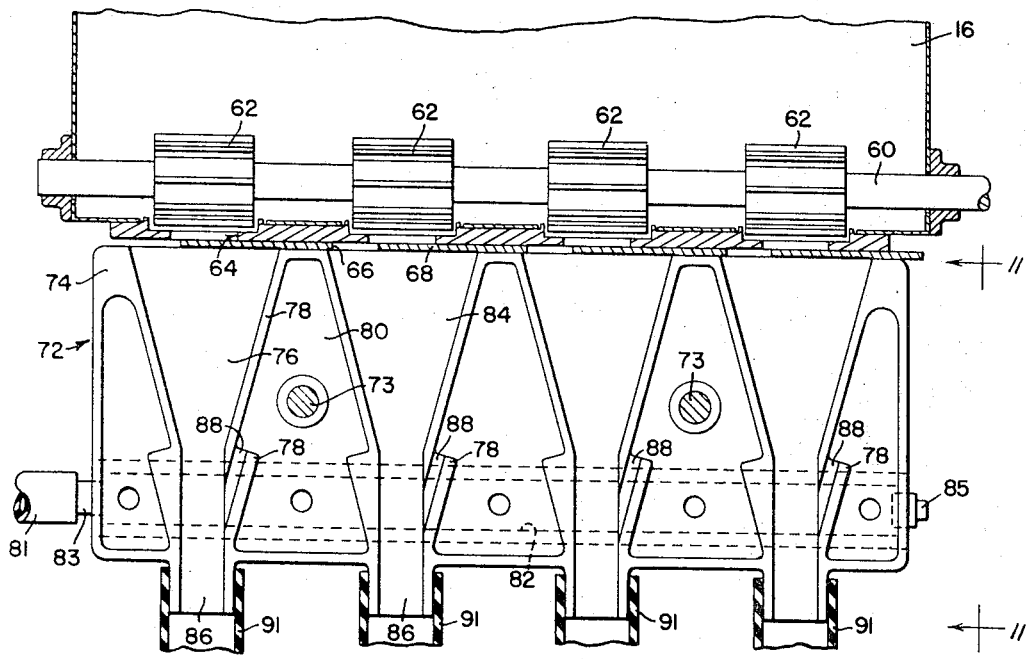
FIG. 6
INVENTORS.
HAROLD V. HANSEN
VIRGIL R. MC CUMBER
BY John C. Thompson
ATTORNEY March 19, 1968   H. V. HANSEN ET AL   3,373,705
PLANTER
Filed April 30, 1965   4 Sheets-Sheet 3

INVENTORS.
HAROLD V. HANSEN
VIRGIL R. MC CUMBER
BY
*John C. Thompson*
ATTORNEY

March 19, 1968
H. V. HANSEN ET AL
3,373,705
PLANTER
Filed April 30, 1965
4 Sheets-Sheet 4
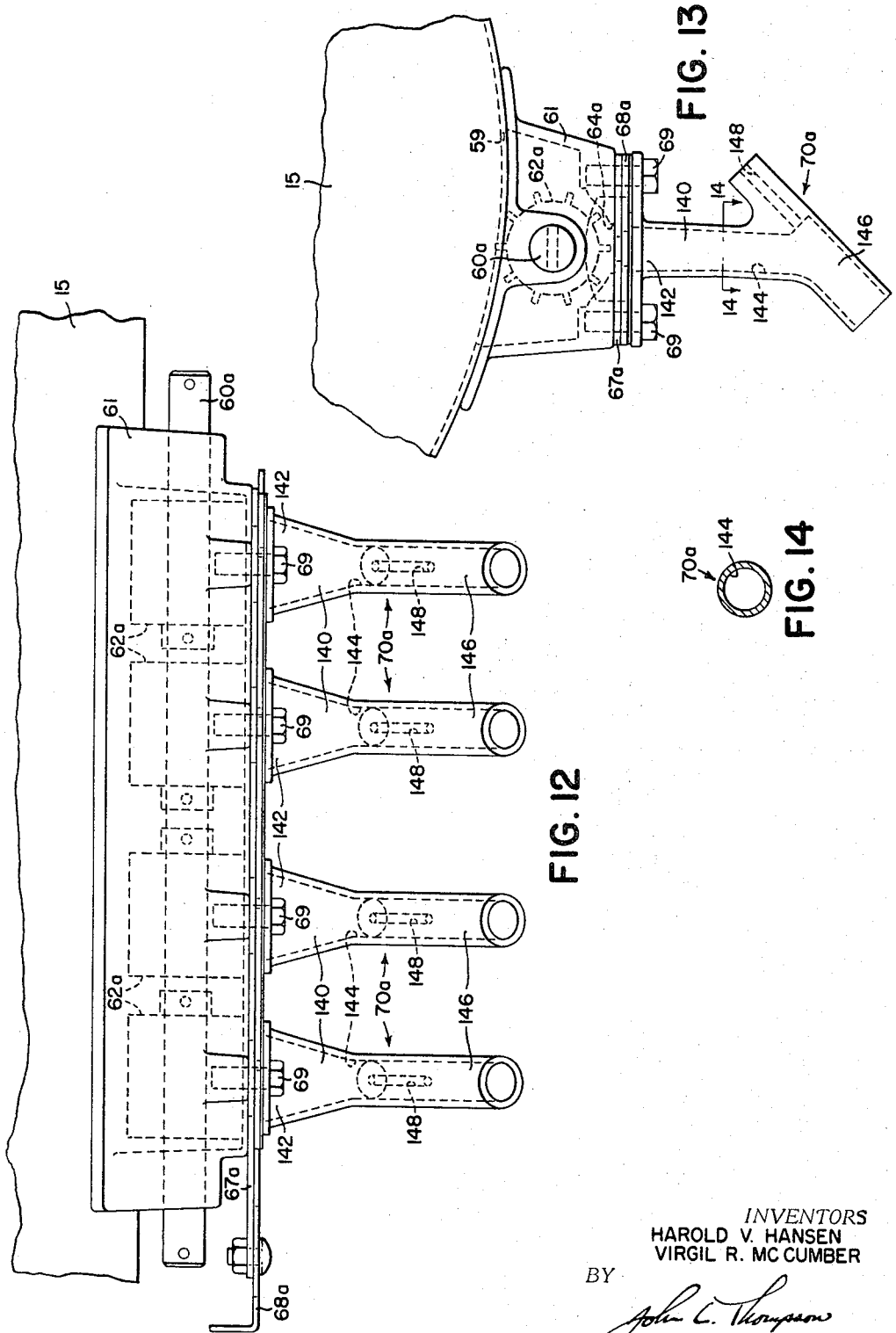
INVENTORS
HAROLD V. HANSEN
VIRGIL R. MC CUMBER
BY John C. Thompson
ATTORNEY United States Patent Office 3,373,705
Patented Mar. 19, 1968

3,373,705
PLANTER
Harold V. Hansen, Cordova, and Virgil R. McCumber, Moline, Ill., assignors to Deere & Company, Moline, Ill. a corporation of Delaware
Continuation-in-part of application Ser. No. 236,606, Nov. 9, 1962. This application Apr. 30, 1965, Ser. No. 452,328
14 Claims. (Cl. 111—73)

This application is a continuation-in-part of applicants' copending U.S. application Ser. No. 236,606, filed Nov. 9, 1962, now abandoned.

The present invention relates generally to agricultural implements and more particularly to planting implements that are adapted to plant a plurality of rows.

The conventional planter of today, such as the type illustrated in the U.S. patent to Oehler et al., No. 2,906,-436, issued Sept. 29, 1959, generally has a transverse frame to which a plurality of longitudinally disposed subassemblies are swingably connected. Each subassembly carries the planting mechanism for one row and includes a seed hopper, a seed selecting means such as the conventional seed plate at the bottom of the hopper, and a furrow opener mounted on the lower forward portion of a seed boot through which the seed generally drops by gravity. In addition if it is desired to apply insecticides and herbicides when planting, the planter is also equipped with separate insecticide hoppers and insecticide selecting and distributing means and separate herbicide hoppers and herbicide selecting and distributing means, one of each for each row or subassembly. Thus, in a four-row conventional planter in which insecticides and herbicides are also distributed, four different seed hoppers and seed selecting and distributing means are employed, four different insecticide hoppers and insecticide selecting and distributing means are employed, and four different herbicide hoppers and herbicide selecting and distributing means are employed, or a total of twelve different hoppers and selecting and distributing means are employed.

While the conventional planter is suitable for planting a few rows at a time at relatively slow speed, the trend today, due to improved tractor design and increased horsepower, is to plant more rows at one time at relatively high speeds, and eight-row conventional planters capable of planting up to seven miles an hour, such as the type illustrated in the U.S. patent to Oehler et al., No. 3,079,174, issued Feb. 26, 1963, are now on the market. The high-speed multirow conventional planter has several disadvantages which are inherent from the use of a multitude of hoppers and independent selecting means. Thus, in a conventional eight-row planter equipped with insecticide and herbicide distributing means it has been estimated that when planting at seven miles per hour as much as eighteen additional minutes must be employed to fill the twenty-four hoppers on the planter for every hour of planting time. Another disadvantage is that it is necessary to individually adjust the selecting means associated with each hopper.

Another disadvantage of the conventional high-speed planter is that it is necessary to provide valve means in the bottom of the seed boot, such as the type shown in the U.S. patent to White, No. 2,340,163, to impart a rearward movement to the seed, the rearward movement imparted to the seed being generally equal to the forward velocity of the planter, whereby the seed will drop directly into the furrow with little relative velocity with respect to the ground.

Therefore it is the object and general nature of the present invention to overcome the aforementioned disadvantages of the conventional planters of today.

Another object of the present invention is the provision of a planting implement particularly constructed and arranged to impel the seed to be planted towards the furrows by means of fluid under pressure. More specifically it is an object of the present invention to provide in a planting implement adapted to plant in a plurality of rows or furrows, a seed hopper having means to select seed for planting in a plurality of rows, and impelling means to propel the seed to the furrow without delay.

Another object of this invention is to provide in a multi-row planter a single herbicide hopper having associated therewith means to select and impel the herbicide to a plurality of rows.

Another object of this invention is to provide in a multi-row planter a single insecticide hopper having associated therewith means to select and impel the insecticide to a plurality of rows.

Another object of the present invention is to provide insecticide or herbicide selecting and distributing means for a plurality of rows that is of simple manufacture and which is adapted to be associated with a single hopper.

Another object of the present invention is to provide a seed impelling tube in which the seed that is dropped into the tube from the seed selecting means is picked up by a stream of fluid under pressure with low or minimal turbulence.

Another object of this invention is to provide a construction whereby the seed impelling tubes may be mounted within a surge chamber on the planter, the surge chamber being operatively associated with the source of fluid pressure.

Another object of the present invention is the provision in a multirow planter of centrally located hoppers for insecticides, herbicides, and seed whereby the filling time of the planter can be materially reduced.

Another object of this invention is the provision in a high-speed planter of fluid pressure means to blow the seed rearwardly into the furrows, thereby eliminating the valves normally found in high-speed planter seed boots.

Another object of the present invention is the provision of a new and improved diffuser for distributing the herbicide onto the ground.

Other objects and advantages of the invention will become clear from the following detailed description when read in conjunction with the accompanying drawings, wherein:

FIG. 1 is a perspective side view of a four-row planter incorporating the principles of the present invention.

FIG. 2 is a sectional view of a seed impelling tube in the present invention associated with a hill drop mechanism.

FIG. 3 is a plan view of the seed impelling tube of FIG. 2.

FIG. 4 is a sectional view of a slightly modified form of the seed impelling tubes of the present invention, the tubes being associated with seed plates and mounted in a hollow frame member of the planter, the frame member also serving as a surge chamber.

FIG. 5 is a plan view of the seed impelling tube of FIG. 4.

FIG. 6 is a side view of a pesticide impeller associated with a pesticide hopper for a four-row planter.

FIG. 11 is an end view of the pesticide impeller taken along the lines 11—11 of FIG. 6.

FIG. 12 is a side view of a modified pesticide impeller associated with a four-row pesticide hopper.

FIG. 13 is an end view of the structure shown in FIG. 12.

FIG. 14 is a section taken on the line 14—14 in FIG. 13.

Figure 7:
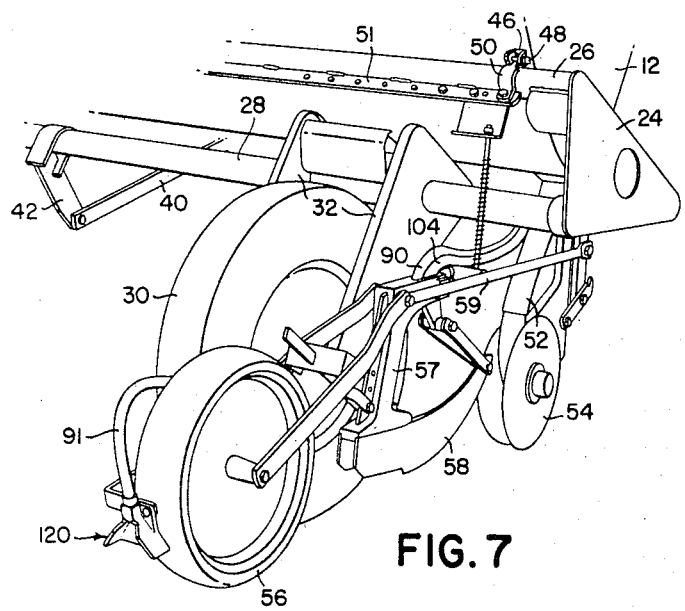
FIG. 7 is a fragmentary perspective rear view of the four-row planter illustrated in FIG. 1.

Referring first to FIG. 1, it will be seen that the present invention has been illustrated as incorporated in a four-row planter indicated generally at 10 in which the planter frame 11 is equipped with two fertilizer hoppers 12, an insecticide hopper 14, a herbicide hopper 16, and a seed hopper 18. While the present invention has been illustrated in a four-row planter, it is to be understood that the principles of the present invention may be incorporated in planters of any row designation.

The planter frame 11 is of generally conventional construction, similar in many respects to the planter frame shown in U.S. Patent No. 2,906,436 and includes forwardly extending draft frame members 20, a front transverse frame member 22, end plates 24, a sill bar 26, and a rockshaft 28 (FIG. 7). Ground wheels 30 (only one of which is shown) are carried by wheel arms 32 which are secured to the rockshaft 28 in a conventional manner. The rockshaft is caused to be rocked by means of a double acting hydraulic cylinder 34 (FIG. 1), the forward end of which is swingably secured to the draft frame members 20, and the rearward end being pivotally connected to a generally vertically extending lever 36. An intermediate portion of lever 36 is fulcrumed about a rod 38, which is in turn carried between the members 20, and the lower portion of the lever 36 is pivotally joined to the forward end of a rearwardly extending link 40. The rearward portion of the link 40 is pivotally secured to a rockarm 42 that is fixed to the rockshaft 28. Extension of the hydraulic cylinder 34 will cause the lever 36 to swing about rod 38, the rotational movement of the lever 36 causing the link 40 to be drawn forwardly, which in turn causes the rockshaft to be rotated in a counterclockwise direction as viewed from FIG. 1. This movement will cause the ground wheels 30 to be lowered thus raising the frame 20 and the ground engaging units 54, 56, and 58 carried thereby. Retraction of the cylinder 34 will cause the rockshaft to be rotated in the opposite direction thus lowering the units 54, 56, and 58 into engagement with the ground.

The fertilizer hoppers 12 are of the type disclosed in U.S. Patent No. 2,906,436 and are secured to the front frame member 22 by the yoke 44. An apertured bracket 46 is secured to the back wall of the hopper 12, and a pin 48 is passed through the apertures in the bracket 46 and behind an upstanding lug 50 secured to the member 51 on the sill bar 26 to hold the hopper in an upright position. The fertilizer is distributed through tubes 52 whose lower ends are secured behind double disk openers 54 that are mounted in a conventional manner as illustrated in U.S. Patent No. 2,975,844. While the fertilizer hoppers and distributing system described above and illustrated in the drawings are of conventional construction, it is to be noted that the broader aspects of this invention can be applied equally as well to the fertilizer distributing system as well as to the other distributing systems employed in conventional planters.

A subassembly including a press wheel 56, a seed boot 57, and a seed furrow opener 58 is provided for each row and is swingably mounted with respect to the planter frame 11 by swingable bars 59.

The seed hopper 18 is preferably mounted behind the insecticide and herbicide hoppers 14 and 16 in any suitable manner as best shown in FIG. 1. The seed hopper in the embodiment illustrated is provided with means for selecting seeds for a plurality of rows, as for example seed plate asemblies, generally indicated at 61 in FIG. 4, and seed impelling tubes 96 of the present invention are associated with the seed selecting mechanism. The impelling tube may be associated either directly with a seed plate mechanism as shown in FIG. 4 or be associated with a hill drop mechanism as illustrated in FIG. 2.

The hill drop mechanism may be of conventional construction having a star wheel 92 disposed within a housing 93, the wheel being mounted for rotation with a shaft 94. The seed is dropped from seed selecting means (which selects one seed at a time) into the star wheel assembly which is geared to rotate at such a speed that the desired number of seeds will accumulate in each pocket of the star wheel. Continued rotation of the star wheel will then cause the accumulated seed to be dropped into the frusto-conical first or receiving portion 98 of the impelling tube 96. The impelling tube is preferably provided with three non-symmetrically spaced (FIGS. 3 and 5) downwardly directed passages 100 through which a fluid under pressure may be forced from chambers 101. The seed is dropped from the star wheel 92 and initially drops by gravity through the first portion 98 of the impelling tube. As the seeds then pass the terminal portion of the passages 100 they are then caused to be blown or impelled by the flow of the fluid (which is preferably air but may be the exhaust gases of the tractor, or other fluids) through the second or discharge portion 102 of the impelling tube and then through the seed conduits 104 (FIGS. 2 and 4). As can be seen from FIG. 10 the terminal portion 106 of the seed conduit 104 is aimed to the rear of the planter. The seed is impelled through the tube 104 by blowing the seed in a rearward direction at a speed approximately equal to the forward velocity of the planter, thus in effect cancelling out the forward velocity imparted to the seed by the forward movement of the planter. When propelled at the aforementioned speed, the seed will tend to drop directly downwardly into the furrow formed by the furrow opener 58. Since the terminal portion 106 of the seed conduit 104 is generally angled downwardly, as can be seen from FIG. 10, it is necessary to impart to the seed a velocity greater than the forward movement of the planter. This velocity is equal to the speed of the planter multiplied by the secant of the angle between the terminal end portion 106 and the fore-and-aft center line of the furrow.

Applicants have found that the construction of the seed impelling tube must be such that the air stream enter the central portion of the tube substantially linearly, having imparted to it little or no rotary movement as it enters the central portion of the impelling tube 96. Any whirlpool effect of the air at the point where the seed enters the air stream causes the seed to hesitate in varying degrees before entering the main downwardly moving air stream. For example, when drilling corn it may be desirable to plant one seed every 8″. Thus, if planting at a speed of 7 miles an hour one seed must be planted every $65/1000$ of a second. Therefore if there is any turbulence at the point where the seed is introduced into the flow of air, the seeds will tend to hesitate for varying lengths of time before they will be taken up by the main stream of air. This turbulence therefore will cause the seeds to be unequally drilled and a correspondingly poor stand of corn will result. Similarly, when hill dropping corn, it is desirable to have all the seed corn placed within a 1½″ grouping. Thus, when hill dropping at 5 miles per hour all the seed must be grouped at the discharge orifice in the seed furrow opener so that in less than $17/1000$ of a second the seed for the hill will be discharged. If any appreciable turbulence exists at the point where the seeds are picked up by the stream of air, it would not be possible to maintain the close grouping necessary for hill drop planting at high speed.

Applicants have found that when three passages 100 are employed in the seed impelling tube, as shown in FIGS. 2–5, it is desirable to have the second and third passages spaced an equal angle $a$ (FIG. 3) from a point opposite the first passage 100. This spacing has been found to be optimum since virtually no turbulence is found to exist when this spacing is employed.

The fluid under pressure may be derived from a pump associated with a tractor (not shown), it may be derived from the exhaust gases of a tractor, or it may be derived from any other suitable source. If the source of fluid pressure creates pressure impulses, as would the exhaust system of the tractor or most conventional pumps, then it is necessary to employ a surge chamber to equalize the pulses. Applicants have found that a surge chamber 116 (FIG. 4) may be incorporated in the framework of the planter, and also has found that if the surge chamber is mounted directly below the seed hopper the impeller tubes 96 may be incorporated within the surge chamber. FIG. 4 shows such a design where each of the impeller tubes 96 (which are of a slightly different construction than that illustrated in FIG. 2) is provided with upper and lower flanged portions 112, 114 respectively. These flanged portions can then be welded to the surge chamber 116, which is preferably a square three-by-three welded tube. The advantage of this construction is that it is not necessary to provide separate chambers 101 about the inlet portion of the passages 100 for each impeller tube. The surge chamber 116 may be carried by or form a part of the sill bar 26.

Figure 9:
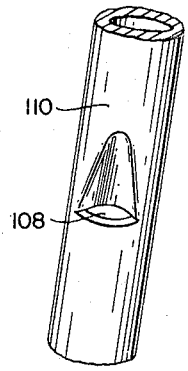
FIG. 9 is a perspective view of a modified form of seed impelling tube.

An alternative form of construction of seed impelling tube is illustrated in FIG. 9 in which a single opening 108 is formed in the impelling tube 110. The opening 108 is formed by slitting the tube (which may be any thin walled pipelike member) on a plane substantially perpendicular to its axis, and then bending a portion of the wall of the tube above the slit inwardly to form the opening 108.

The pesticide hoppers 14 and 16 are mounted between the two fertilizer hoppers 12 in any suitable manner (FIG. 1). Each of these hoppers is substantially identical in construction and is provided (as shown in FIG. 6 in which a herbicide hopper and one form of distributor means is illustrated) with a shaft 60 which carries four feed rotors 62. These feed rotors are of the type illustrated in U.S. Patent 3,178,079. The shaft 62 can be rotated in any manner and is preferably driven from the ground wheels 30. Four openings 64, one for each rotor, are provided in the bottom of each hopper and these, in conjunction with the opening 66 in the adjustable slide plate 68, determine the rate at which the insecticide or herbicide material will pass into the impeller member 70.

It should be noted at this point that when distributing granular herbicide or insecticide material that turbulence within the impelling member 70 is of little concern since there is a constant stream of small particles being entrained into the flow of air, and these particles need not be spaced with the degree of accuracy as is necessary with seed. Therefore it is possible to employ constructions in the impelling member 70 where the whirlpooling effect of air is present.

In the construction illustrated in FIGS. 6 and 11 the impelling member is formed from two substantially identical members 72 which are placed in face-to-face contact and held together by fasteners 73. Each member 72 is provided with a substantially planar face 74 having vertically disposed grooves 76 therein which, when placed in face-to-face contact with another member 72, forms an elongated opening or passageway. Disposed between the grooves are land areas 78 which are also disposed between the ends of the members 72 and the outermost grooves, the land areas having depressed interior land portions 80 which are interconnected by a transverse bore 82, one end being provided with a plug 85. The grooves or throats are provided with a frusto-conical first or receiving portion 84 that receives the insecticide or herbicide from the hopper, and a second or discharge portion 86 is provided at the bottom portion of the impeller tube or groove. A notch 88 is formed in the land areas 78 and interconnects the depressed land areas 80 with the grooves 76. The notches are so positioned that they are at an acute angle to the vertical axis of the associated grooves 76.

In operation the herbicide or insecticide is fed into the frusto-conical first portion 76 of the impelling member 70 from the hopper 14 or 16. Fluid under pressure is introduced into the transverse bore 82 through hose 81 and fitting 83 from a source of fluid under pressure (not illustrated). The fluid under pressure flows through the depressed land areas 80 and then into the downwardly directed notches 88. The fluid under pressure then picks up the particles of insecticide or herbicide and impels or blows them through the discharge portions 86 of the impelling tubes into the conduits 90, 91 (FIG. 1).

In FIGS. 12–14 a modified form of a pesticide hopper and pesticide impelling means is shown. The hopper 15 for the pesticide (which could either be an insecticide or a herbicide) is provided with a large longitudinally extending opening 59 which is enclosed on one side by a casting 61. Rotatably disposed within the casting is a shaft 60a about which are disposed four feed rotors 62a. The bottom of the casting is provided with four openings 64a, one for each rotor, which cooperate with openings in an adjustable slide plate 68a and a fixed plate 67a, the relative position of the plates 67a, 68a determining the rate at which the insecticide or herbicide material will be distributed.

Secured to the casting 61 are four impeller members 70a, one for each rotor 62a. Each impelling member is secured to the casting 61 by a pair of bolts 69 which pass through holes and slots in the plates 67a, 68a. Each impelling member is provided with an elongated opening or passageway having a throat or receiving portion 140, an intermediate portion 144 and a discharge portion 146. The throat portion tapers downwardly from a relatively large opening 142 which receives the material to be distributed to the intermediate portion 144. The downwardly directed discharge portion 146 is preferably disposed at a 45° angle to the intermediate portion 144 and is of the same cross-sectional area as the intermediate portion. Coaxial with the discharge portion 146 is an inlet portion 148 through which fluid under pressure may be introduced into the discharge portion 146 to propel the pesticide outwardly through conduits (not shown) which are generally similar to the conduits 90, 91 shown in FIG. 1. The inlet opening 148 is of a diameter considerably smaller than the diameter of the portion 146. Fluid under pressure is introduced into the passageways 148 by means of conduits (not shown) which are generally similar to the conduit 81 shown in FIG. 6.

The operation of this form of impelling structure is essentially the same as that shown in FIGS. 6 and 11.

Figure 10:
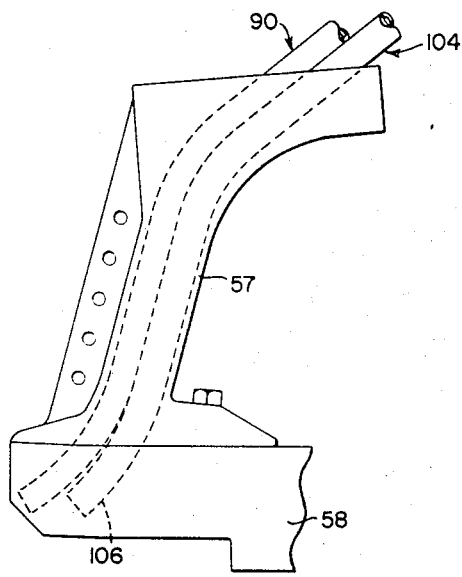
FIG. 10 is a side view of the seed boot employed in the planter of the present invention.

The insecticide material is discharged directly behind the seed through conduits 90 as best shown in FIG. 10 and is largely conventional.

Figure 8:
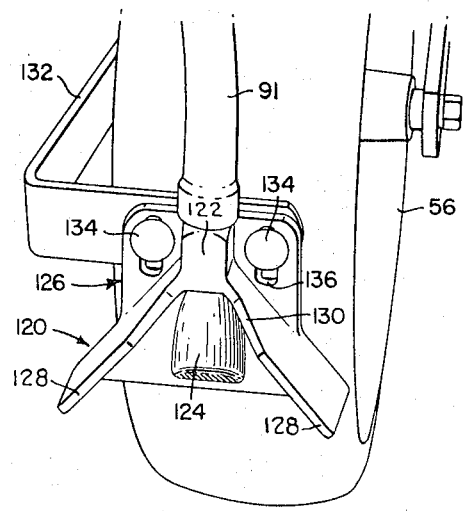
FIG. 8 is a perspective view of a herbicide diffuser.

The herbicide is directed through conduits 91 to a diffuser 120 mounted behind the press wheel 56 as is best shown in FIGS. 7 and 8. The diffuser has an upwardly extending portion 122 that receives one end of the impeller conduit 91. Mounted directly below the upwardly extending portion is a diffusing lug 124 which tends to scatter the herbicide into a relatively broad band. The diffusing lug 124, as is the upwardly extending portion 122, is formed integrally with the main platelike body 126 of the diffuser 120. Extending outwardly and rearwardly from the plate 126 are two flanges 128 that form an inverted V above and to the sides of the lug 124, the upper portions of the flanges being cut away as at 130 to permit the herbicide to pass directly from the conduit 90 to the lug 124. The flanges 128 serve to confine the herbicide. The width of the band of herbicide may be adjusted by either swinging the arm 132 up or down, or by loosening the bolts 134 and positioning or sliding the diffuser 120 up and down within the slots 136.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. A planter comprising a wheeled frame, a seed hopper mounted on the frame, said hopper having a plurality of seed selecting means, a plurality of furrow openers mounted on the frame, means interconnecting the seed selecting means with the furrow openers, said means including a plurality of impelling tubes, each of said tubes including a first portion that receives the seed from the associated seed selecting means and a second portion that discharges the seed, means leading away from the second portion of each impelling tube to the associated opener, each impelling tube being provided with passages in its walls, said passages being directed inwardly towards the second portion, and a surge chamber connected to a source of fluid pressure, said impelling tubes being carried by the surge chamber with said passages being in communication with said surge chamber.

2. The invention set forth in claim 1 wherein the surge chamber is an integral part of the frame and supports said seed hopper.

3. The invention set forth in claim 1 further characterized by said surge chamber being an elongated pipe-like member which is substantially square in cross section.

4. The invention set forth in claim 1 further characterized by said impelling tube being provided with first and second flanges on said first and second portions respectively, said flanges being adapted to be secured to the edges of openings provided in the wall of the surge chamber.

5. The invention set forth in claim 1 further characterized by the passages in said impelling tube being nonsymmetrically located about the axis of the impelling tube.

6. An impelling member for use with an agricultural implement, said member comprising two substantially identically shaped parts, each of said parts having a face adapted to be placed in face to face contact with another of said parts, each of said faces being provided with a plurality of longitudinally extending grooves, land areas between the grooves, the interior portion of the land areas being depressed, notches interconnecting the depressed land areas with the grooves and at an acute angle to the grooves, at least one of said two parts being provided with a transverse bore that interconnects the depressed portions with at least one side of said part, said bore passing behind said grooves, the parts being so constructed and arranged that fluid under pressure introduced into the transverse bore will pass through the depressed portions and through the notches.

7. The invention set forth in claim 6 further characterized by the grooves having at least one V-shaped end.

8. In a multirow planter, a seed hopper adapted to carry seed for a plurality of rows, seed selecting means associated with said seed hopper for selecting seeds for each of said rows, impelling tube means interconnected with the seed selecting means and adapted to receive seeds for each of said rows, conducting means leading away from each of the impelling tube means to conduct the seed to the ground, means to impel the seed from the impelling tube means, said impelling tube means including a first portion that receives the seed from the seed selecting means, a second portion that discharges the seed into the means leading away from the tube, and a plurality of passage means terminating between said first and second portions of each of the impelling tubes and being disposed at an acute angle with respect to said first portion, said plurality of passage means being nonsymmetrically located about the axis of each of the impelling tubes, said impelling means being fluid under pressure which is introduced into said passage means and directed inwardly towards the second portion, the fluid under pressure being introduced substantially linearly into said second portion, whereby the seeds are impelled into and through the conducting means.

9. In a planter adapted to be propelled forwardly over a field at a predetermined first speed, seed dispensing means, insecticide dispensing means, a seed having generally vertically extending conduit receiving means extending therethrough, a furrow runner opener mounted adjacent the bottom of said boot, first and second conduits disposed at least in part in said conduit receiving means, each of said conduits having initial and terminal end portions, the terminal end portion of said first and second conduit being adjacent the bottom of the boot and the terminal end portion of the first conduit being angled rearwardly, means to introduce seed into the initial end of said first conduit, means to introduce fluent insecticide material into said second conduit, first means to propel the seed through the first conduit and out of the terminal end portion at a predetermined second speed whose rearward component of velocity is substantially equal to the first speed whereby the seed will drop directly downwardly into the furrow formed by the furrow opener, and second means to propel the insecticide material through the second conduit, said first and second means comprising fluid under pressure.

10. In a precision seed planter for planting seed at preselected spaced intervals and adapted to be propelled forwardly over a field at a predetermined first speed, seed dispensing means including a seed boot having a generally vertically extending conduit receiving means extending therethrough, a furrow runner opener mounted adjacent the bottom of said boot, a conduit disposed at least in part in said conduit receiving means and having initial and terminal end portions, said terminal end portion being adjacent the bottom of the boot and angled rearwardly, means to introduce seed at preselected spaced time intervals into the initial end of said conduit, and means to introduce fluid under pressure continuously into said conduit means during planting to propel the seed through the conduit and out of the terminal end portion at a predetermined second speed whose rearward component of velocity is substantially equal to the first speed, the parts being so arranged and constructed that the seed will tend to drop directly downwardly into the furrow formed by the furrow opener without relative fore-and-aft movement whereby preselected seed spacing may be accomplished.

11. A method of planting seed and applying insecticide material to a field comprising: propelling a supply of seed and a separate supply of insecticide material over a field at a predetermined first speed, selecting and dispensing seed from said supply of seeds at preselected intervals, dispensing insecticide material from said supply of insecticide, entraining said insecticide and said seeds in parallel columns of air, directing rearwardly the terminal portion of the column of air that carries the seed, and causing said last-mentioned column of air to move at a predetermined second speed whose rearward component of velocity is substantially equal to the predetermined first speed, whereby the discharged seeds are caused to drop directly downwardly onto the field.

12. In a planter adapted to be propelled forwardly along a fore-and-aft line over a field at a predetermined first speed, seed dispensing means including a seed boot having a generally vertically extending conduit receiving means extending therethrough, a furrow runner opener mounted adjacent the bottom of said boot, a conduit disposed at least in part in said conduit receiving means and having initial and terminal end portions, said terminal end portion terminating adjacent the bottom of the boot and being angled rearwardly and lying in the plane of the fore-and-aft line, means to introduce seed into the initial end of the conduit, and means to propel the seed through the conduit and out of the terminal end portion, said means including fluid under pressure having a velocity equal to the secant of the angle between the terminal end portion and the fore-and-aft center line times the predetermined first speed whereby the seed will tend to drop directly downwardly into the furrow formed by the furrow opener.

13. An agricultural implement adapted to dispense material to a plurality of rows comprising:
   a frame,
   hopper means mounted on the frame and adapted to carry material to be dispensed to a plurality of rows,
   a plurality of material selecting means operatively associated with said hopper means, each of said material selecting means having a discharge opening associated therewith through which material is caused to be discharged,
   impelling means mounted below said openings, each of said impelling means having a passageway having
      a receiving portion that receives the material to be dispensed from the material selecting means,
      a discharge portion,
      and inlet passage means directed inwardly towards the discharge portion and interconnected with the passageway between the receiving and discharge portions,
      the cross sectional area of the inlet means being appreciably smaller than the cross sectional area of said discharge portion whereby no back pressure is developed in the receiving portion,
   and conducting means leading away from the discharge portion of each of the impelling means to conduct the material to be dispensed to the rows,
   said inlet passage means being adapted to receive fluid under pressure and introduce said fluid into the passageway to impel material discharged by the material selecting means into and through the conducting means.

14. Dispensing means comprising: a hopper, a plurality of material selecting means operatively associated with said hopper, each of said material selecting means having an opening associated therewith through which the material to be distributed is discharged, impelling members mounted below all of said openings, each of said impelling members having a throat portion which receives material discharged through said opening, an intermediate portion in direct communication with the throat portion, said intermediate portion receiving material from said throat portion, a discharge portion in communication with said intermediate portion and at an angle thereto, said intermediate portion and said discharge portion having substantially the same diameters, and an inlet portion in direct communication with the intermediate portion and coaxial with and of less diameter than the discharge portion, the inlet portion receiving fluid under pressure which impels material discharged into the throat portion and received in the intermediate portion out of said discharge portion.

References Cited
UNITED STATES PATENTS

| | | | |
|---|---|---|---|
| 934,828 | 9/1919 | Nation | 111—14 |
| 1,810,671 | 6/1931 | Matheson. | |
| 2,506,658 | 5/1950 | White | 111—85 X |
| 3,133,515 | 5/1964 | Beebe | 111—36 |

FOREIGN PATENTS

| | | |
|---|---|---|
| 596,790 | 10/1925 | France. |
| 1,284,678 | 1/1962 | France. |
| 14,346 | 1914 | Great Britain. |

ABRAHAM G. STONE, *Primary Examiner.*

J. R. OAKS, *Assistant Examiner.*